United States Patent [19]

Pradhan et al.

[11] Patent Number: 5,961,818
[45] Date of Patent: Oct. 5, 1999

[54] PROCESS FOR THE PRODUCTION OF LPG AND HIGH OCTANE AROMATIC HYDROCARBONS FROM NON-ECONOMICALLY VIABLE PETROLEUM FEED STOCK

[75] Inventors: Ajit Ram Chandra Pradhan; Nagabhatla Viswanadham; Mohan Lal Sharma; Uma Shanker; Nirmalya Ray; Turuga Sundara Rama Prasada Rao, all of Dehradun, India

[73] Assignee: Council of Scientific and Industrial Research, New Delhi, India

[21] Appl. No.: 09/282,979

[22] Filed: Mar. 31, 1999

Related U.S. Application Data

[63] Continuation of application No. 08/803,238, Feb. 20, 1997, abandoned.

[51] Int. Cl.⁶ .................................................. C10G 35/095
[52] U.S. Cl. ................ 208/135; 208/120.01; 208/120.25
[58] Field of Search ...................................... 585/407, 410, 585/411, 418, 486; 208/120.01, 135, 120.25

[56] References Cited

U.S. PATENT DOCUMENTS

| | | | |
|---|---|---|---|
| 3,941,871 | 3/1976 | Dwyer et al. | 423/326 |
| 5,151,259 | 9/1992 | Blom | 423/328 |

*Primary Examiner*—Thomas Dunn
*Attorney, Agent, or Firm*—Morgan & Finnegan, L.L.P.

[57] ABSTRACT

The present invention relates to a process for production of LPG and high octane aromatic hydrocarbon from non-economically viable petroleum feedstock, which comprises passing the same feedstock through zinc-aluminosilicate molecular sieve (Zn-ZSM-5), in a reactor at a temperature in the range of 300–600° C. pressure 1 to 30 atmosphere liquid hourly space velocity of 1 to 10 $hr^{-1}$ and nitrogen to hydrocarbon molar ratio 1 to 4.

9 Claims, No Drawings

PROCESS FOR THE PRODUCTION OF LPG AND HIGH OCTANE AROMATIC HYDROCARBONS FROM NON-ECONOMICALLY VIABLE PETROLEUM FEED STOCK

This is a continuation of prior application Ser. No. 08/803,238 now abandoned, filed Feb. 20, 1997.

FIELD OF THE INVENTION

The present invention relates to an improved process for the preparation of liquified petroleum gas (LPG) and high octane aromatic hydrocarbon from non-economically viable petroleum feed stocks over a novel zinc aluminosilicate molecular sieve catalyst. The present invention particularly relates to a process for the preparation of LPG and aromatic hydorcarbons such as benzene, toluene, ethylbenzene and xylene(BTX) from petroleum feed stocks such as aromatic extraction raffmates, light naphtha straight run naphtha over a zinc-aluminosilicate molecular sieve catalyst.

BACKGROUND OF THE INVENTION

Proposed lead phase-out in Indian Gasoline and changing international petroleum market have led to large and rapid variations of feed costs and availability. In the present scenario, an important factor to boost profitability is to take advantage of those variations and to produce high value and high demand products. Different petroleum feedstocks such as aromatic extraction raffinate and naphtha, specially light naphtha are considered only as fuel or feedstock for stem cracking and syngas production during long periods. This is due to high vapour pressure (RVP) and low octane rating of these feedstocks. They are also non-reformable by conventional catalytic-reforming processes. These non-economically viable petroleum feedstocks can effectively be converted to valuable aromatics such as LPG and other useful by- products.

In India, total naphtha production in 1991–92 was 3.85 MMTPA which is expected to increase to 6.98 MMTPA by 1996–76. During the same time, the demand for high octane gasoline and LPG is expected to increase drastically. At the end of 9th Indian five year plan (2001–2). The deficit between production and demand for LPG is projected to be 5.837 MMTPA; while that for motor gasoline will be 1.524 MMTPA. Hence, good amount of foreign exchange has to be spent to import these two products as the demand can not be set by indigenous resources.

In today's changing world petroleum market, it is essential to update the process strategies needed to make best profits. Hence, today's aromatic and gasoline processing complexes need versatility to be able to process cheaper, sometimes unwanted and varibly available feedstocks. It will be quite attractive and economical to convert such feedstocks into aromatic hydrocarbons boiling in the gasoline range, and LPG, utilising the shape selective features of medium pore zeolite molecular sieve.

Aromatic hydrocarbons such as benzene, toluene, ethylbenzene and xylenes(BTX) are also used as feedstocks for the preparation of chemical and petrochemical products. Aromatics chemicals constitute about one third of the total organic compounds known today. They are important chemical precursors for the production of detergent and polymers among others.

PRIOR ART RELATING TO THE INVENTION

Conventionally, BTX hydrocarbons are obtained by catalytic reforming process of naphtha. The catalyst used for the process is pt/$Al_2O_3$ monometallic catalyst or pt.Re/$Al_2O_3$ bimetallic catalyst. Although these processes are used all over the world, there are number of limitations in the use of those catalyst for the above mentioned process. These limitations are:

i) The conventional catalyst is not effective in promoting aromatisation of $C_5$ hydrocarbons. Hence, it cannot be used for the aromatisation of feedstocks like aromatic extraction raffmates or light naphtha which contain appreciable amount of n-pentane and iso-pentane.

ii) The catalyst is also not very effective in promoting the aromatisation of straight chain paraffins such as n-hexane and n-heptane present in the feed that remain unconverted.

iii) All catalytic reforming units require an organic chloride additive to provide the proper balance between acid and metal function. The organic chloride is broken down during reforming process into hydrochloric acid, a waste product targeted for stricter regulations.

iv) The process results in the formation of gasoline in the range 75–95 research octane and hence, requires use of tetraethyl lead to boost octane number during blending.

However, the process of present invention can be used for the production of such aromatics. Production of LPG carries much significance since demand for LPG is always increasing in India and in other countries.

There are reports in the literature on the conversion of straight chain paraffins into aromatics, using zeolites and metal doped zeolites catalysts. An article published in literature Ind. Engg. Chem. Pros. Design dev., 25 (1986) 1511 describes a process proposed by Mobil Research and Development for the preparation of aromatics from variety of feedstocks such as pyrolysis gasoline, unsaturated gases, from catalytic cracker, Paraffin naphtha and LPG. The process describes use of purely acidic H-ZSM-5 catalyst.

Another report [Hydrocarbon Process., Sep. 1989 p-72] describes a process developed jointly by UOP Inc. and British Petroleum based on gallium doped zeolite catalyst. In this process LPG is converted into BTX aromatics and the process has been demonstrated in a large scale pilot plant at the British's Petroleum Graigemouth Refimery in Scotland. U.S. Pat. No. 5,026,938 dated Jun. 25, 1991 describes a process for converting a gaseous feedstock containing $C_3$–$C_5$ paraffins to aromatic hydrocarbons by contacting the feed with gallosilicate molecular sieve catalyst.

Zeolite ZSM-5 is a crystalline aluminosilicate whose preparation was first disclosed and is described in a U.S. Pat. No. 3,702,886. The framework structure is well established and the catalyst is reported to have many catalytic applications "Sihicalite", having a similiar zeolite structure constituted by pure crystalline $SiO_2$, has been described by E. M. Flannigen (Nature, 271 (1978) 512). The highly ordered rigid structure with three dimensional lattice can accommodate $MeO_4$ in addition to $SiO_4$ tetrahedra; Me being, for example Al,Fe,Ga,Ti or B, However Zinc-aluminosilicate used into present invention contains Zn in addition to Al and Si, and is expected to possess crystalline structure siniliar to ZSM-5 zeolite.

SUMMARY OF THE INVENTION

The main objective of the present invention is to provide an improved process for the production of LPG and high octane aromatic hydrocarbon from an economically viable petroleum feedstock over a zinc-alurninosilicate molecular sieve catalyst(Zn-ZSM-5).

DETAILED DESCRIPTION OF THE INVENTION

Accordingly, the present invention provides an improved process for the production of LPG and high aromatic hydrocarbon from non-economically viable petroleum feedstock, which process comprises passing the same feedstock through zinc-aluminosilicate molecular sieve in a reactor, at a temperature in the range of 300–600° C., pressure of 1 to 30 atmospheres and liquid hourly space velocity of 0.1 and 10 hr$^{-1}$ and nitrogen to hydrocarbon molar ratio 1 to 4.

The novel porous crystalline synthetic catalyst employed in the present process has the general formula expressed in the form of oxides: M 2/n o. x Al$_2$O$_3$ Y SiO$_2$, Z ZnO wherein, M represents a proton and / or a metallic cation, n is the valency of the said cation, Y/x is a number ranging from 5 to 1000(SiO$_2$/Al$_2$O$_3$) molar ratio. This catalyst preferably comprising 0.8 wt % of Al (as Al$_2$O$_3$), 1.7 or 3.3 wt % of Zn(asZnO) 97.5 and 95.9 of Si (as SiO$_2$) on anhydrous basis.

In one embodiment of the present invention, feedstocks available with conventional petroleum refinery such as aromatics extraction raffinate, low aromatic such as light naphtha is use in the process disclosed according to the present invention.

In another embodiment of the present invention, high octane aromatic hydrocarbons produced during the process are used as BTX aromatics or as blending stock for high octane motor gasoline.

In still another embodiment of the present invention, the LPG produced during the process of the present invention which is a major by-product, is used directly for domestic purpose or can be processed further for the production of high value products.

In yet another embodiment of the present invention, the zinc-aluminosilicate molecular sieve is incorporated in another material more resistant to the temperature and other conditions employed in the process. Such matrix material includes synthetic or naturally occurring substances as well as clay, silica alumina or metal oxides such Ga, Ti, Fe, Al or B. The relative proportion of molecular sieve and matrix material on an anhydrous basis may vary with molecular sieve content ranging between 10 to 90% by weight.

In another embodiment of the present invention, optional metals like sodium, potassium, gallium, platinum, tin, iron, or rhenium are advantageously incorporated into a zinc-aluminosilicate molecular sieve either during synthesis or subsequently by impregnation and/or ion-exchange. Incorporation of one or more of these metals in the molecular sieve is expected to enhance activity, selectivity and life of the catalyst. The total amount of such added metals may vary between 0.1 to 0.5% by weight. More details about the novel Zn-ZSM-5 catalyst are given in U.S. Ser. No. 08/784,150, filed Jan. 17, 1997 by A. Pradham et al. entitled "Catalyst Comprising Oxides of Silicon, Zinc And Aluminum Used For the Preparation Of LPG And High Octane Aromatics And A Process For Preparing The Same."

In or more embodiment of the present invention, 5 cc of the catalyst in extruded form of 1/16 diameter is loaded in a fixed bed, down flow, high temperature, high pressure catalytic reactor. Nitrogen was used as a carrier gas.

The liquid product was analyzed using a Helwett Packard gas chromatograph model 5730A fitted with TCEP column and FID detector. Gaseous products were analyzed using a squalance column.

The following examples will serve to illustrate the process of this invention without limiting the scope or utility thereof.

EXAMPLE-1

This example describes the results using aromatic extraction raffinate as feed. The zinc-aluminosilicate molecular sieve catalyst has a composition containing 0.8 wt % Al (as Al$_2$O$_3$) and 3.3 wt % Zn (as ZnO) on an anhydrous basis. The total metal content of Na, Fe, Ca, Pt, Sn and/or Re in the catalyst is up to 0.5 wt %. Same catalyst was used for all further studies. The activity results of two different temperatures and feed characteristics are presented in Table 1.

TABLE 1

Aromatic Extraction Raffinate as feed:Effect of Temperature

Catalyst: Zinc-aluminosilicate; feed: Aromatic extraction raffinate; Pressure: 10 kg/cm$^2$; Space velocity: 2 hr$^{-1}$; N$_2$/HC: 2; Time-one-stream: 2 hr.

| Temperature (° C.) | 400 | 500 |
|---|---|---|
| Feed Characteristics | | |
| IBP | | 46.1 |
| FBP | | 131.9 |
| Density | | 0.686 |
| Product Composition | | |
| Conversion (wt %) | 89.7 | 96.4 |
| Selectivity (%) | | |
| Methane | 2.8 | 5.7 |
| Ethane + Ethylene | 10.5 | 9.3 |
| LPG | 51.8 | 52.9 |
| n-pentane + isopentane | 1.7 | 0.9 |
| Aromatics | 33.3 | 31.3 |

EXAMPLE-2

This example explains the effect of time-on-stream when aromatic extraction raffinate was used as feed. The product analysis are presented in Table 2. With increase in time-on-stream fall in convention from 96.4 to 93.7 wt % was observed. But at the same time it resulted in increase in aromatic selectivity from 31.3 to 34.6% and decrease in LPG selectivity from 52.9 to 48.3.

TABLE 2

Aromatic Extraction Raffinate As Feed: Effect of Time-on-stream

Catalyst: Zinc-aluminosilicate; Feed: Aromatic Extraction raffinate; Pressure: 10 kg/cm$^2$; Space velocity: 2 hr$^{-1}$ N$_2$/HC; Temperature: 500° C.

| Time-on-stream (hr) | 2 | 5 |
|---|---|---|
| Product Composition | | |
| Conversion (wt %) | 96.4 | 93.7 |
| Selectivity (%) | | |
| Methane | 5.7 | 3.8 |
| Ethane + Ethylene | 9.3 | 11.4 |
| LPG | 52.9 | 48.3 |
| n-pentane + isopentane | 0.9 | 1.9 |
| Aromatics | 31.3 | 34.6 |

EXAMPLE-3

This example includes the results using naphtha (70–90° C.) as feed. The feed characteristics and product analysis are presented in Table 3.

TABLE 3

Naphta (70–90° C.) as Feed

Catalyst: zinc-aluminosilicate; Feed: Naphtha;
Pressure: 10 kg/cm$^2$; space velocity: 2 hr$^{-1}$; N$_2$/HC: 2

| Temperature (°C.) | 500 |
|---|---|
| Feed Characteristics | |
| IBP | 70.0 |
| FBP | 90.0 |
| Density | 0.715 |
| Product Composition | |
| Conversion (wt %) | 94.5 |
| Selectivity (%) | |
| Methane | 3.5 |
| Ethane + Ethylene | 6.5 |
| LPG | 47.5 |
| n-pentane + isopentane | 0.2 |
| Aromatics | 42.5 |

EXAMPLE-4

This example describes the results using naphtha (87–137° C.) as feed. The reaction was carried out under optimised reaction conditions. Results of the catalytic studies are presented in Table 4.

TABLE 4

Naphtha (87–137° C.) as Feed

Catalyst: Zinc-aluminosilicate ; Feed: Naphtha;
Pressure: 10 kg/cm$^2$; Space velocity: 2 hr$^{-1}$; N$_2$/HC: 2
Time-on-stream: 2 he; Temperature: 500° C.

| Feed Characteristics | |
|---|---|
| IBP | 87.0 |
| FBP | 137.0 |
| Density | 0.788 |
| Product Cornposition | |
| Consversion (wt %) | 89.0 |
| Selectivity (%) | |
| Methane | 4.2 |
| Ethane + Ethylene | 4.9 |
| LPG | 38.1 |
| n-petane + isopentane | 0.3 |
| Aromatics | 52.5 |

The Main Advantages of the Present Invention are as Follows i) The process of present invention converts non-economically viable petroleum feedstocks into LPG and high octane aromatic products valuable in both petrochemical and gasoline market.

ii) Aromatic extraction raffmate or light naphtha, which does not have a potential as conventional reformer feedstock can be used as fuel.

iii) LPG, which is major by-product can meet the great industrial and domestic demands.

iv) Unlike conventional reforming process, the present process produces spectrum of aromatic products using any naphtha fraction.

v) The process does not require use of hydrogen.

vi) The process also does not require use of corrosive organic chloride additives.

vii) The catalyst is not very sensitive to sulphur compounds and moisture and hence, it can be retrieved and reused thereby saving cost.

viii) The catalyst shows similiar activity even after seventeen regenerations deactivations. The process is expected to use swing mode of operation or continuous catalyst regeneration mode of operation.

We claim:

1. A process for the production of LPG and high octane aromatic hydrocarbons from non-economically viable petroleum feedstock, which comprises passing the feedstock through a Zn-ZSM-5 catalyst in a reactor at a temperature in the range of 300–600° C., a pressure of 1 to 30 atmospheres, a liquid hourly space velocity of 1 to 10 hr$^{-1}$ and a nitrogen to hydrocarbon molar ratio of 1 to 4;

wherein Zn forms part of the crystalline framework of the catalyst, the catalyst having the general formula expressed in the form of oxides: $M_{2/n}O$, x $Al_2O_3$, y $SiO_2$, z ZnO wherein M represents a proton and/or a metallic cation, n is the valency of the cation, x, y and z represent the number of moles of $Al_2O_3$, $SiO_2$, and ZnO, respectively, y/x is a number ranging from 5 to 1000 and z/y is a number ranging from 5 to 1000.

2. A process as claimed in claim 1 wherein the zinc-aluminosilicate catalyst comprises 0.8 wt % of Al (as $Al_2O_3$), 1.7 or 3.3 wt % of Zn (as ZnO) and 97.5 or 95.9 of Si (as $SiO_2$) on an anhydrous basis.

3. A process as claimed in claim 1 wherein the feedstock is passed through the catalyst at a temperature in the range of 450–550° C., a pressure of 5 to 15 atmospheres, a liquid hourly space velocity 0.5 to 4 hr$^{-1}$ and a nitrogen to hydrocarbon molar ratio of 2.

4. A process as claimed in claim 1 wherein the non-economically viable petroleum feedstock is selected from the group consisting of aromatic extraction raffinate and naphtha.

5. A process as claimed in claim 1 wherein one or more metals selected from the group consisting of sodium, gallium, platinum, tin, potassium, iron and rhenium is incorporated into the Zn-aluminosilicate catalyst.

6. A process as claimed in claim 5 wherein the total amount of metal incorporated into the Zn-aluminosilicate catalyst is between 0.1 and 0.5% by weight.

7. A process as claimed in claim 1 wherein the Zn-aluminosilicate catalyst is incorporated into a matrix selected from the group consisting of clay, silica, alumina and metal oxides of Ga, Ti, Fe, Al or B.

8. A process as claimed in claim 7 wherein the relative proportion of catalyst and matrix material on an anhydrous basis ranges from 10 to 90% by weight.

9. A process as claimed in claim 1 wherein the Zn-aluminosilicate catalyst is incorporated into a matrix selected from the group consisting of synthetic and naturally occurring substances.

* * * * *